(12) United States Patent
Mehringer et al.

(10) Patent No.: US 9,273,709 B2
(45) Date of Patent: Mar. 1, 2016

(54) FURNITURE CONNECTION SYSTEM

(71) Applicant: OFS Brands Inc., Huntingburg, IN (US)

(72) Inventors: Donn B. Mehringer, Francisco, IN (US); Rick L. Rademacher, Jasper, IN (US); Tommy K. Owens, French Lick, IN (US); Doug Shapiro, Jasper, IN (US)

(73) Assignee: OFS Brands Inc., Huntingburg, IN (US)

( * ) Notice: Subject to any disclaimer, the term of this patent is extended or adjusted under 35 U.S.C. 154(b) by 245 days.

(21) Appl. No.: 13/871,041

(22) Filed: Apr. 26, 2013

(65) Prior Publication Data

US 2013/0283587 A1    Oct. 31, 2013

Related U.S. Application Data

(60) Provisional application No. 61/638,944, filed on Apr. 26, 2012.

(51) Int. Cl.
    *F16B 12/10*    (2006.01)
    *A47B 87/00*    (2006.01)
    *A47C 13/00*    (2006.01)

(52) U.S. Cl.
    CPC ............. *F16B 12/10* (2013.01); *A47B 87/007* (2013.01); *A47C 13/005* (2013.01); *Y10T 29/49815* (2015.01); *Y10T 403/1674* (2015.01)

(58) Field of Classification Search
    CPC .... A47B 87/00; A47B 87/007; A47B 87/008; A47B 87/0284; A47C 13/00; A47C 13/005; A47C 17/00; A47C 17/34; A47C 17/045; A47C 17/86; A47C 4/02; A47C 4/022; A47C 4/028; A47C 7/00; A47C 7/02; A47C 7/42; F16B 12/10; F16B 12/20; F16B 12/24; F16B 12/26

See application file for complete search history.

(56) References Cited

U.S. PATENT DOCUMENTS

| | | | | |
|---|---|---|---|---|
| 1,505,308 A | * | 8/1924 | Brown | 108/107 |
| 2,466,204 A | * | 4/1949 | Brown | 297/115 |
| 2,793,685 A | * | 5/1957 | Spitz | 297/411.27 |
| 3,669,494 A | * | 6/1972 | Lohmeyer | 297/440.14 |
| 3,973,800 A | * | 8/1976 | Kogan | 297/440.23 |
| 4,077,666 A | * | 3/1978 | Heumann | 297/440.14 |
| 4,365,840 A | * | 12/1982 | Kehl et al. | 297/440.2 |
| 4,591,289 A | * | 5/1986 | Vickers et al. | 403/322.4 |
| 5,265,939 A | * | 11/1993 | Self et al. | 297/440.13 |
| 5,486,041 A | * | 1/1996 | Sykes | 312/111 |

(Continued)

FOREIGN PATENT DOCUMENTS

EP    1386563 A1 *    2/2004

*Primary Examiner* — Daniel Wiley
(74) *Attorney, Agent, or Firm* — James C. Eaves, Jr.; Brian W. Chellgren; Bingham Greenebaum Doll LLP (57) ABSTRACT

Disclosed herein are furniture connection systems for connecting modular furniture components while disguising the connections between components. In some embodiments, a first furniture component is coupled to a second furniture component via a removable bracket, the bracket being secured to the second furniture component via a fastener extending through an opening in the bracket into an attachment hole in the second furniture components. In these embodiments, the furniture connection system further includes a button element having a head and a shank. When the bracket and fastener are removed, the shank of the button element is inserted into the attachment hole causing the head of the button element to cover the attachment hole, thereby disguising the presence of the attachment hole in the second furniture component.

17 Claims, 12 Drawing Sheets

(56) References Cited

U.S. PATENT DOCUMENTS

| | | | |
|---|---|---|---|
| 5,584,530 A * | 12/1996 | Rogers et al. | 297/188.1 |
| 5,890,767 A * | 4/1999 | Chang | 297/440.14 |
| 6,769,750 B2 * | 8/2004 | Hughes et al. | 312/265.5 |
| 7,806,474 B2 * | 10/2010 | Wahl et al. | 297/248 |
| 8,764,114 B1 * | 7/2014 | Frank et al. | 297/440.16 |
| 2009/0045666 A1 * | 2/2009 | Westendorf et al. | 297/440.1 |
| 2011/0233976 A1 * | 9/2011 | Hanson et al. | 297/217.1 |
| 2012/0256464 A1 * | 10/2012 | Chang | 297/440.16 |

* cited by examiner

FURNITURE CONNECTION SYSTEM

CROSS REFERENCE TO RELATED APPLICATION

This application claims the benefit of priority to U.S. Provisional Patent Application Ser. No. 61/638,944, filed Apr. 26, 2012, entitled FURNITURE CONNECTION SYSTEM, incorporated herein by reference.

FIELD

The present invention relates to furniture systems. More specifically, the present invention relates to furniture systems using modular components configured to disguise the connections between components.

BACKGROUND

Modern offices often include open plan workspaces, where modular furniture can be reconfigured to meet business needs. Due to changes in personnel, storage needs, and other factors, furniture may need to be added or removed from a location. Modular furniture components may be mechanically connected using screws, nails, bolts, or other fasteners. However, when the furniture components are later disconnected, unsightly holes from the screws, nails, bolts, or other fasteners remain.

SUMMARY

Disclosed herein is an office furniture system using modular components configured to disguise the connections between components.

One aspect of the present invention pertains to a modular furniture system comprising: a first furniture component having a first surface and a rear surface opposite the first surface; a second furniture component having a front surface including at least one attachment hole; a bracket; and a button element having a head and a shank adapted to be inserted into the at least one attachment hole; wherein, upon removal of the button element, the bracket connects the first furniture component and the second furniture component by contacting the first surface and the front surface. In some embodiments, the bracket includes an opening, and a fastener extends through the opening and into the at least one attachment hole. In further embodiments, the front surface includes at least one recessed portion configured to receive a portion of the bracket.

In certain embodiments, the modular furniture system includes two first furniture components as described above and includes at least two brackets as described above, and the second furniture component includes at least two attachment holes. In certain of these embodiments, the two first furniture components are positioned adjacent to each other and adjacent to the second furniture component such that at least a portion of the rear surface of each first furniture component contacts the front surface of the second furniture component. A clip for connecting the two adjacent first furniture components may also be included.

In further embodiments, the first furniture component is box shaped, with an internal cavity, a rim surrounding the internal cavity, and a removable lid configured to fit atop the rim. In certain embodiments, the lid includes at least one descending tab sized to fit within the internal cavity of the first furniture component. In some embodiments, the first surface is the surface of the internal cavity opposite the rear surface of the box.

In some embodiments, the bracket serially includes a first vertical portion, a transverse portion, and a second vertical portion, the second vertical portion including an opening. The first vertical portion extends into the internal cavity, the transverse portion extends across the rim, and the second vertical portion extends upwards along the front surface such that the opening is aligned with the attachment hole. In certain embodiments, the first surface includes at least one recessed portion or a plurality of recessed portions configured to receive a portion of the bracket whereby the received portion of the bracket is either flush or recessed to the first surface. The lid, when positioned on the rim of the first furniture element, conceals the bracket.

In some embodiments, the head of the button element is larger than the at least one attachment hole. In further embodiments, the shank of the button element is configured such that a friction fit removably maintains the shank within the at least one attachment hole.

Another aspect of the present invention pertains to a method for removably connecting a first furniture component and a second furniture component, the method comprising: providing a first furniture component having a first surface and a rear surface opposite the first surface; providing a second furniture component having a front surface including at least one attachment hole; providing a button element having a head and a shank, the shank of the button element positioned within the at least one attachment hole; removing at least one button element from the second furniture component; positioning the rear surface of the first furniture component adjacent to the front surface of the second furniture component; and connecting the first furniture component to the second furniture component using a bracket. In some embodiments, the step of connecting further comprises inserting a fastener through an opening in the bracket and into the at least one attachment hole. In further embodiments, the step of connecting further comprises positioning a portion of the bracket in a recessed portion of the first surface.

A further aspect of the present invention pertains to a method for disconnecting a first furniture component and a second furniture component, the method comprising: providing a first furniture component; providing a second furniture component, the first furniture component and second furniture component being connected by a bracket fastened to an attachment hole in the second furniture component; removing the bracket; and inserting a button element in the attachment hole. In some embodiments, the button element includes a head configured to match the aesthetics of the second furniture component and a shank extending from the head, the shank configured to friction-fit within the attachment hole.

DESCRIPTION

For the purpose of promoting an understanding of the principles of the present embodiment illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

Generally, the present system, method, and apparatus provide attachment mechanisms for connecting adjacent, modular pieces of furniture in an unobtrusive, yet secure fashion. While the figures herein illustrate one specific implementation, the invention as illustrated will be adapted and modified by those skilled in the art as will occur to them in view of the present disclosure.

Figure 1:
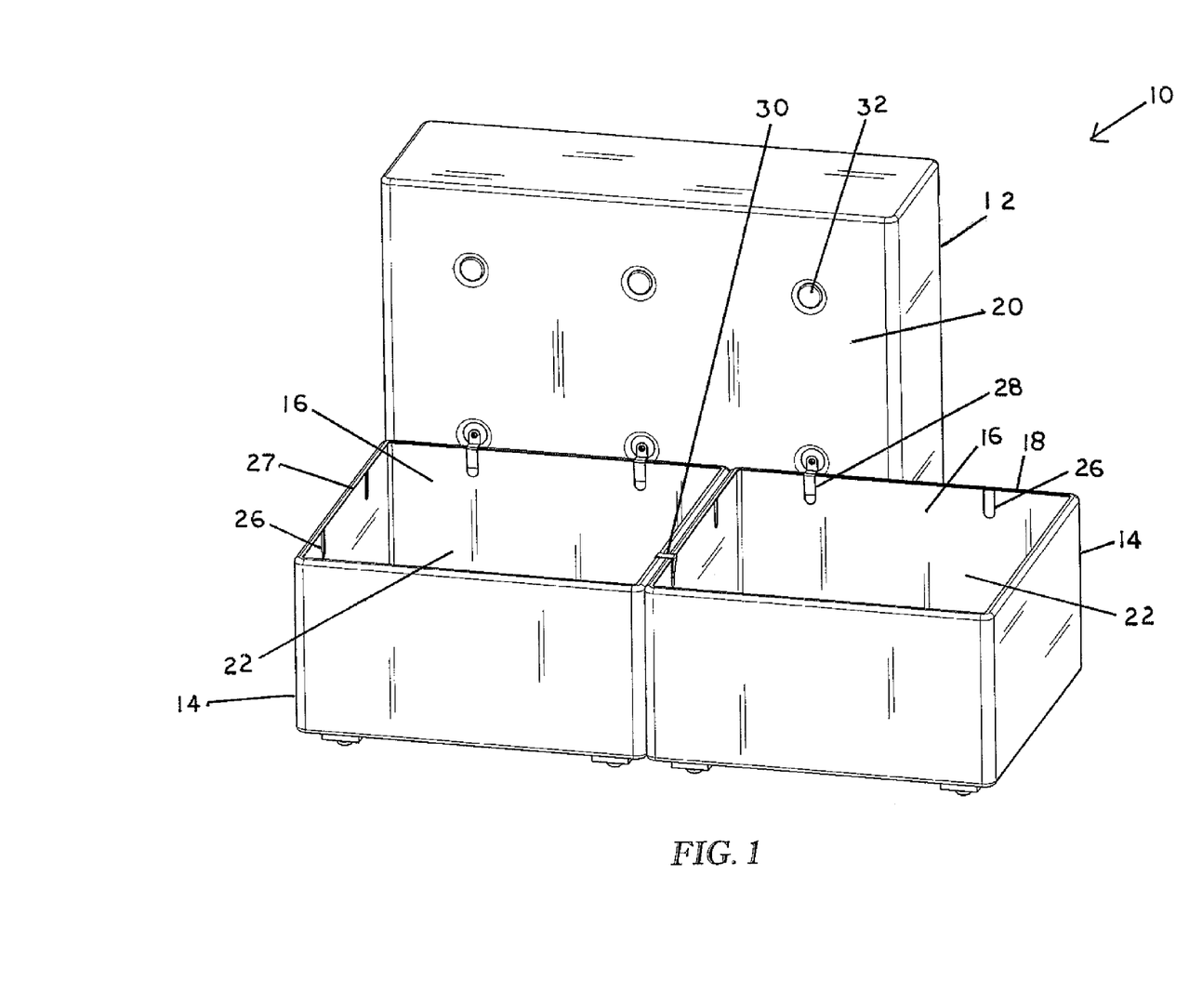
FIG. 1 is a front perspective view of a first embodiment of a furniture connection system including a second furniture component and two first furniture components with lids removed.
Figure 2:
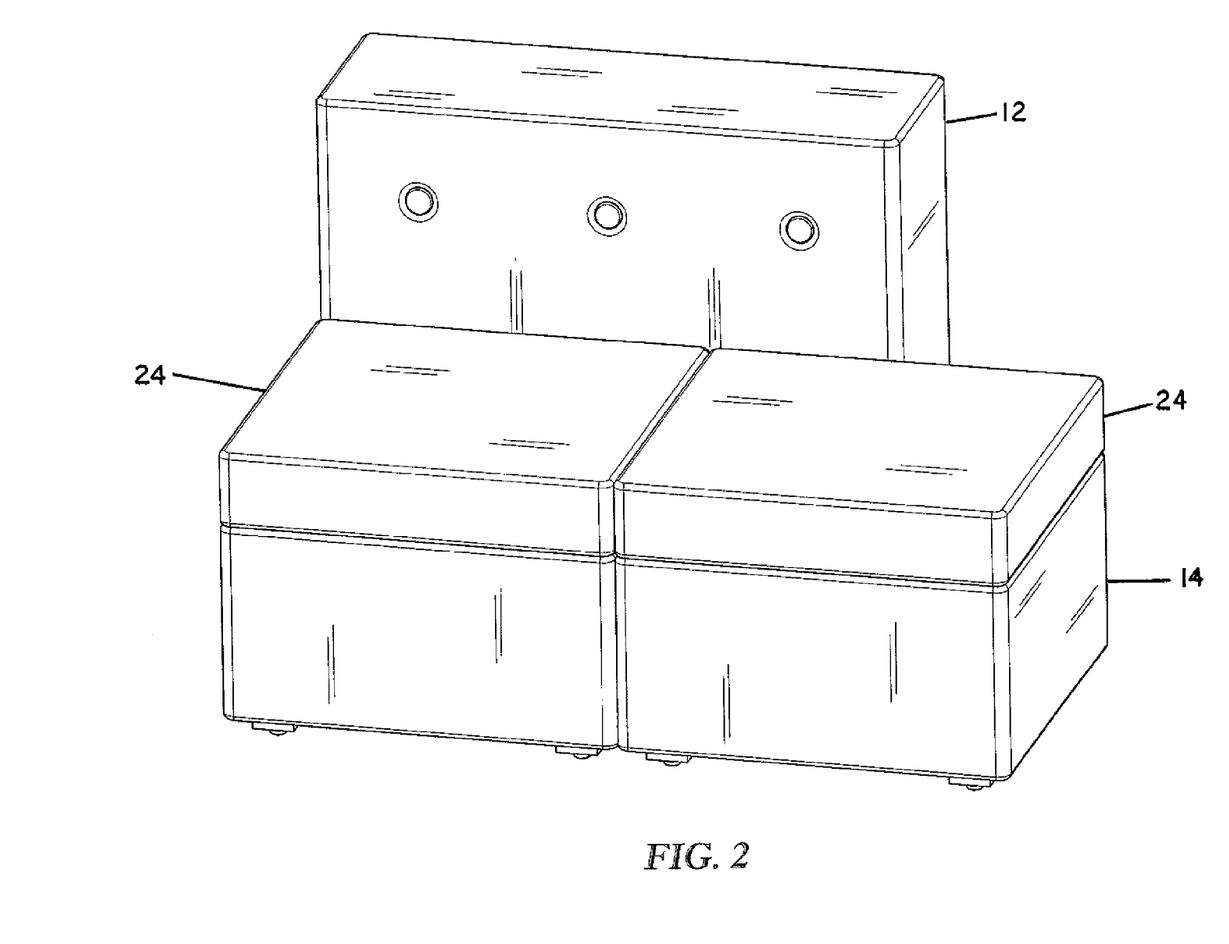
FIG. 2 is a front perspective view of the first embodiment of a furniture connection system from the first furniture components.

FIGS. 1 and 2 illustrate a first embodiment of a furniture connection system 10. In this embodiment, a second furniture component 12, namely, a vertical panel, is positioned behind two first furniture components 14, namely, seat-box units, to provide a seating space with a back. As shown, the first furniture components 14 each include a first surface 16 and a rear surface 18 opposite the first surface 16. The second furniture component 12 includes a front surface 20. When connected, the rear surface 18 of the first furniture component 14 is adjacent to the front surface 20 of the second furniture component 12. In FIG. 1, cushioned lids 24 of the seat-box units have been removed to show the interior cavity 22 of each box-like first furniture component 14 and the mechanism for connecting the furniture components 12, 14 and components 14, 14. When the lids 24 are present, as shown in FIG. 2, the mechanism for connecting the furniture components 12, 14 is obscured from view.

As can be seen in FIG. 1, the interior of each seat-box in this embodiment includes recessed portions 26 near the rim 27. The recessed portions 26 can be formed by using a router on the interior of the cavity 22 or using other suitable techniques. The recessed portions 26 may be formed in one, a plurality, or all sides of the cavity 22. Each recessed portion 26 is adapted to receive a bracket 28 that is attached to the adjacent second furniture component 12. One or more square-cornered U-shaped clips 30 connect adjacent first furniture components 14, 14 maintaining the seat-boxes in a fixed relative position. In some embodiments, the U-shaped clip 30, bracket 28, or both are configured to partially fit within the recessed portions 26 so that the clip 30 or bracket 28 is flush or recessed with the interior surface of the cavity 22. The second furniture component 12 includes at least one button element 32, described in further detail below, aesthetically filling at least one attachment hole (not visible in these figures) that is strategically placed to match up with a recessed portion 26 of the first furniture component 14.

Figure 3:
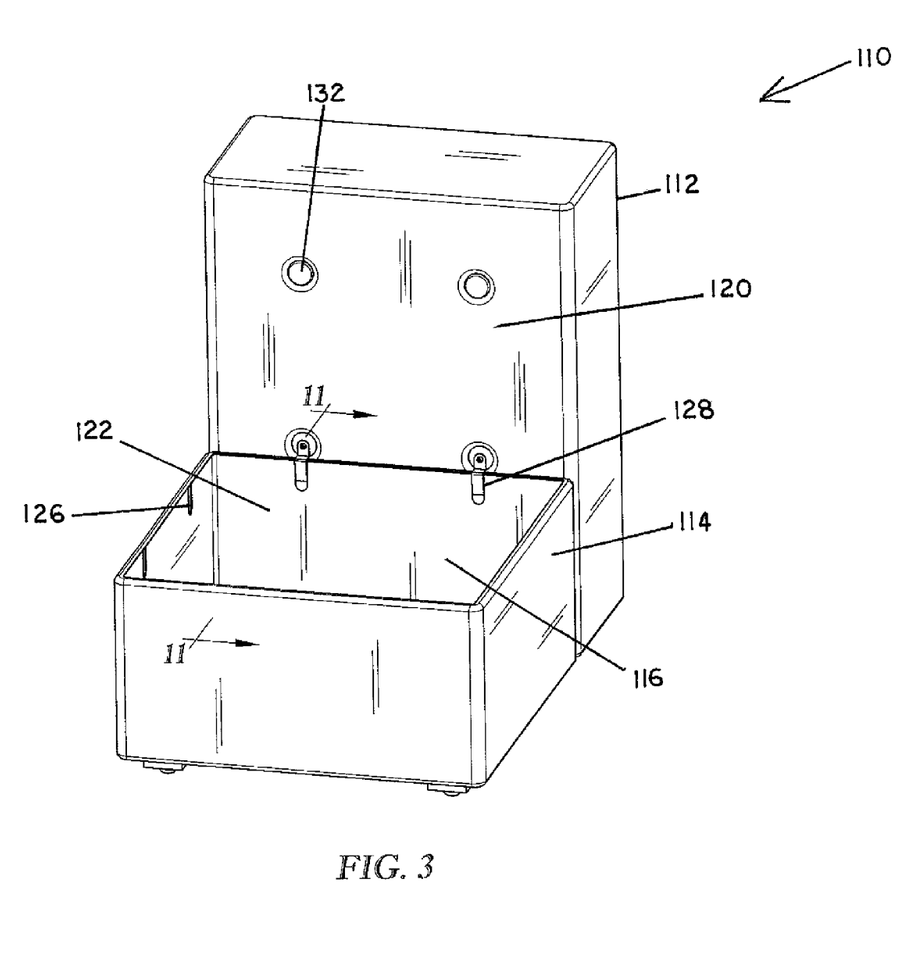
FIG. 3 is a front perspective view of a second embodiment of a furniture connection system including a second furniture component and a first furniture component with lid removed.
Figure 4:
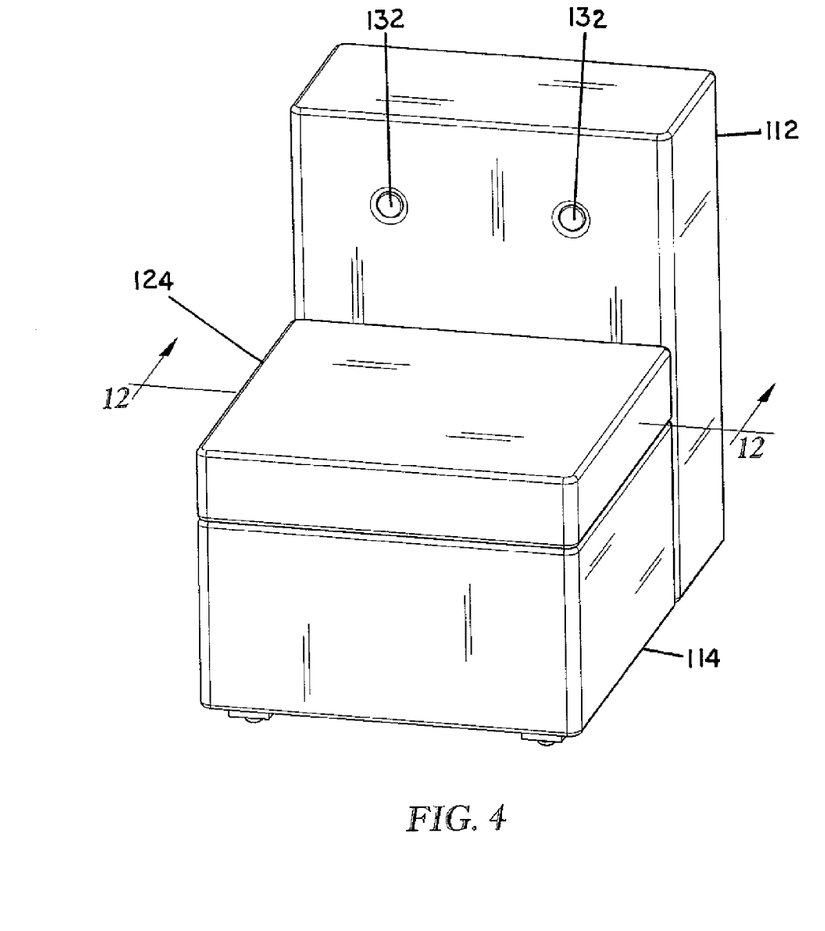
FIG. 4 is a front perspective view of a second embodiment of a furniture connection system including a second furniture component and a first furniture component.

FIGS. 3-4 illustrate a second embodiment of a furniture connection system 110. In this embodiment, a single first furniture component 114 is positioned in front of and adjacent to a second a second furniture component 112, forming a seating space with a back. FIG. 3 depicts this second embodiment 110 with the lid 124 removed from the first furniture component 114, while FIG. 4 shows the lid 124 in place. In this embodiment, the second furniture component 112 is a vertical panel with four attachment holes, two with inserted button elements 132 and two with attached brackets 128. In this embodiment, the button elements 132 and attachment holes are positioned to form an aesthetically pleasing pattern that coincides with reasonable attachment points for other modular furniture components, namely, the first furniture component 114. The button elements 132 in this embodiment also press against the upholstery of the second furniture component 112, supplementing the aesthetic effect.

Figure 5:
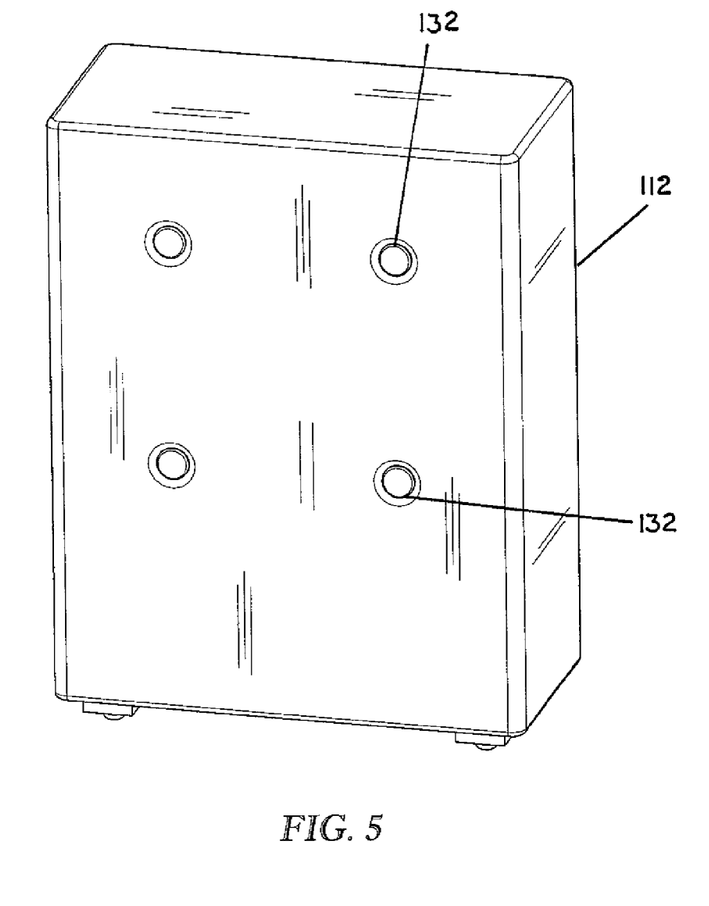
FIG. 5 is a front perspective view of a second furniture component.
Figure 6:
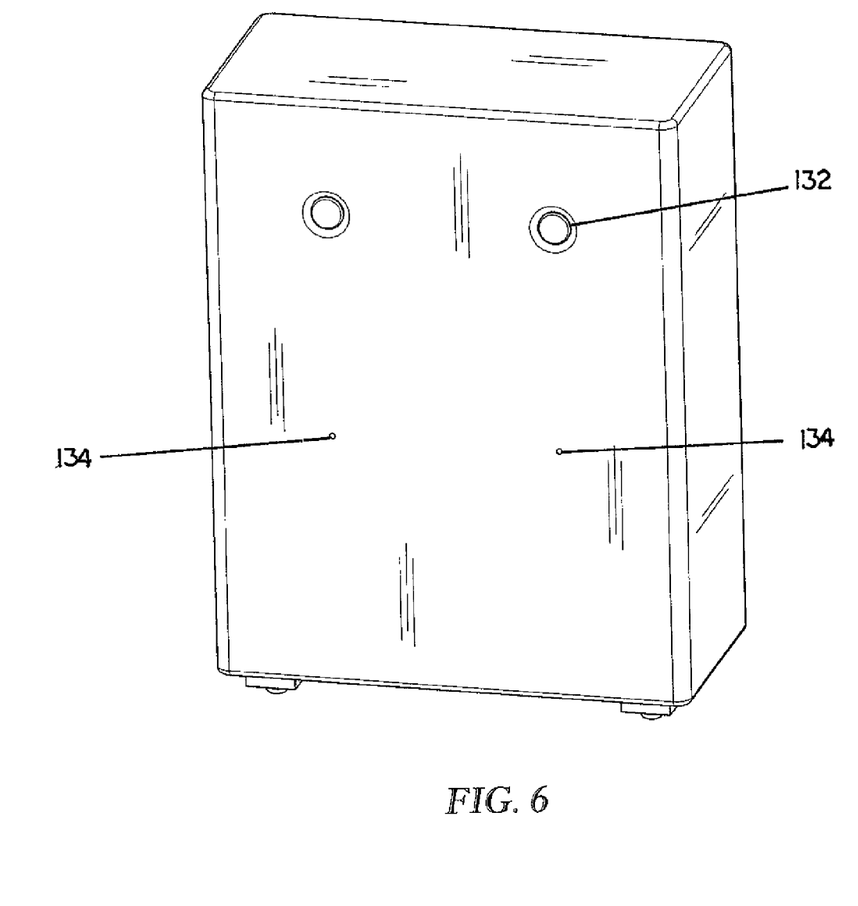
FIG. 6 is a front perspective view of the second furniture component with button elements removed.
Figure 7:
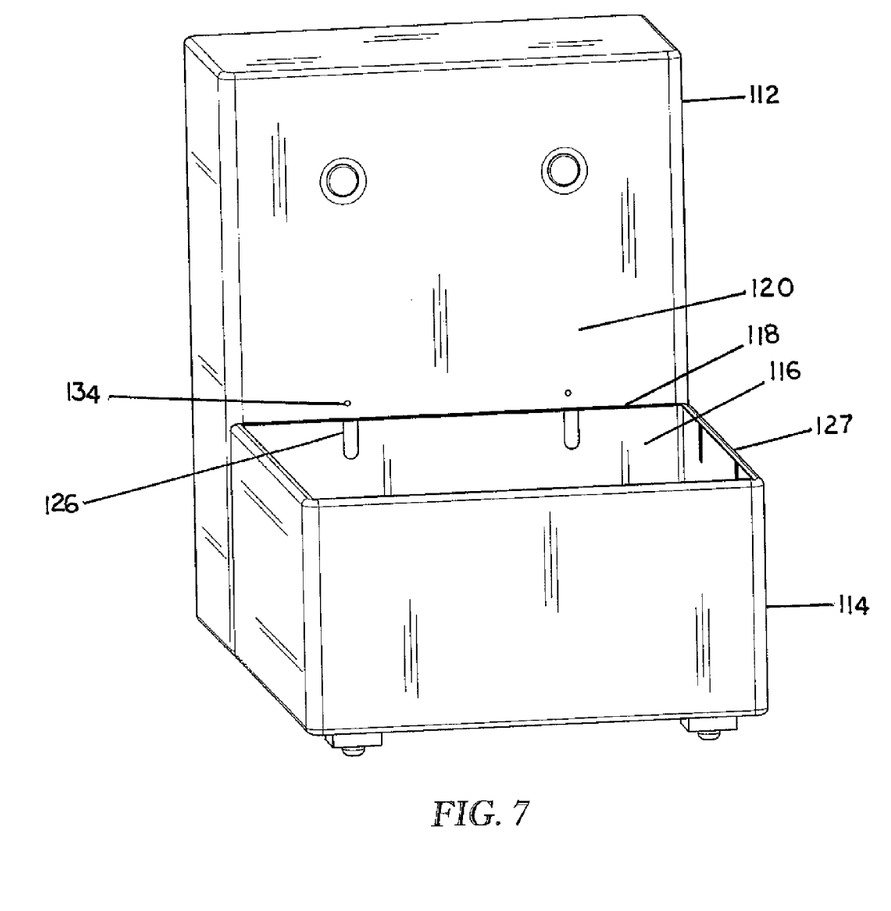
FIG. 7 is a front perspective view of a first furniture component placed adjacent to the second furniture component.

FIGS. 5-8 show a method of connecting a first furniture component 114 to a second furniture component 112. As shown in FIG. 5, the second furniture component 112 is a vertical panel with four button elements 132 in place, each inserted in an attachment hole 134. In this embodiment, the button elements 132 are friction-fit into the attachment holes 134 so they can be pulled out with the application of modest force. FIG. 6 shows the same second component 112, with two button elements 132 removed, revealing two attachment holes 134. FIG. 7 shows the second furniture component 112 of FIG. 6, with a first furniture component 114 positioned in front. The rear surface 118 of the first furniture component 114 is adjacent the front surface 120 of the second furniture component 112. The attachment holes 134, no longer filled by button elements 132, are seen aligned with recessed portions 126 on the first surface 116 of the first furniture component 114. These attachment features are visible only because the lid 124 of the first furniture component 114 has been removed.

Figure 8:
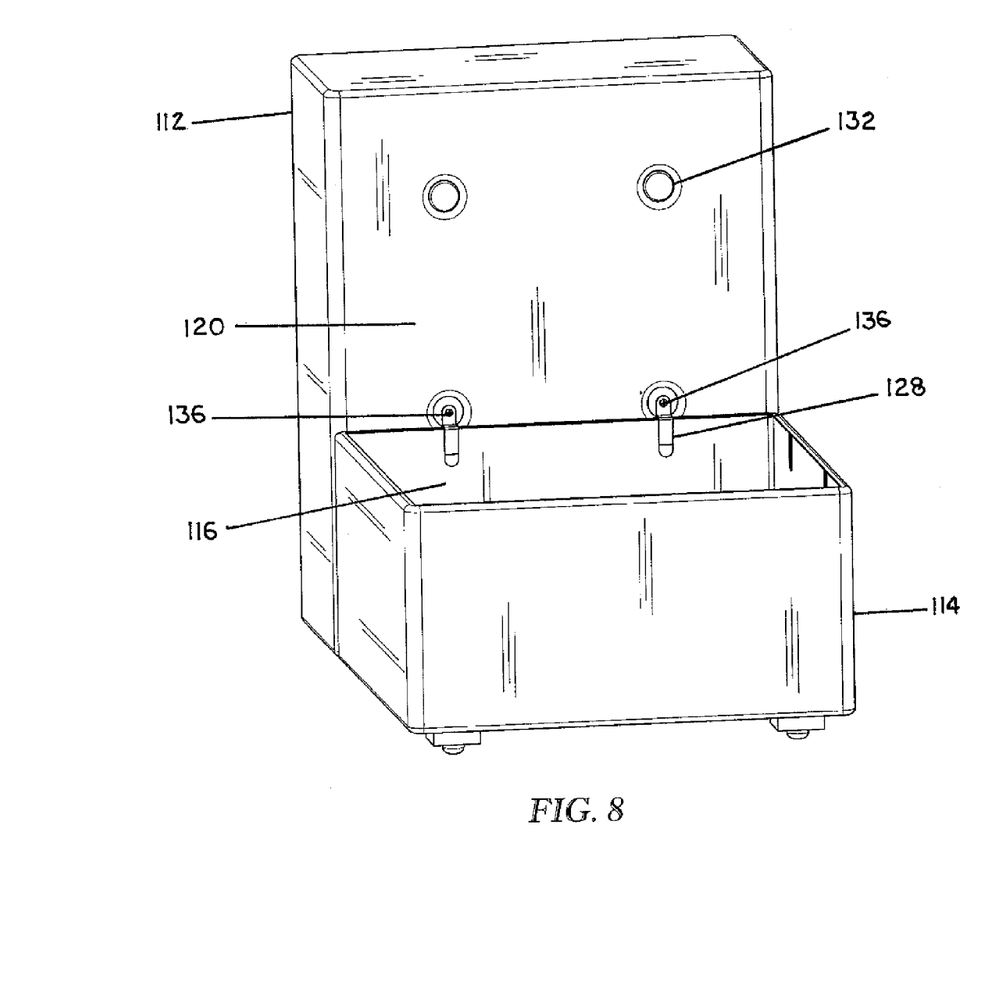
FIG. 8 is a front perspective view of the first and second furniture components, including brackets connecting the first and second furniture components.

To attach these furniture components together, a roughly S-shaped bracket 128 is placed in the recessed portion 126, across the rim 127 of first furniture component 114, and over the attachment hole 134. In this embodiment, a fastener 136, such as a screw or nail, is fed through an opening (not visible in these figures) in the bracket 128 and into the attachment hole 134, thus holding the first furniture component 114 to the second furniture component 112. FIG. 8 shows the furniture components 112, 114 with brackets 128 in place. Upon disassembly of the modular furniture components 112, 114, the button elements 132 are reinserted into the attachment holes 134 to disguise the attachment holes 134 and maintain the aesthetics of the second furniture component 112. Due to the nature of the disclosed connection mechanism, no holes or other disfigurements are left on the first furniture component 114.

Figure 9:
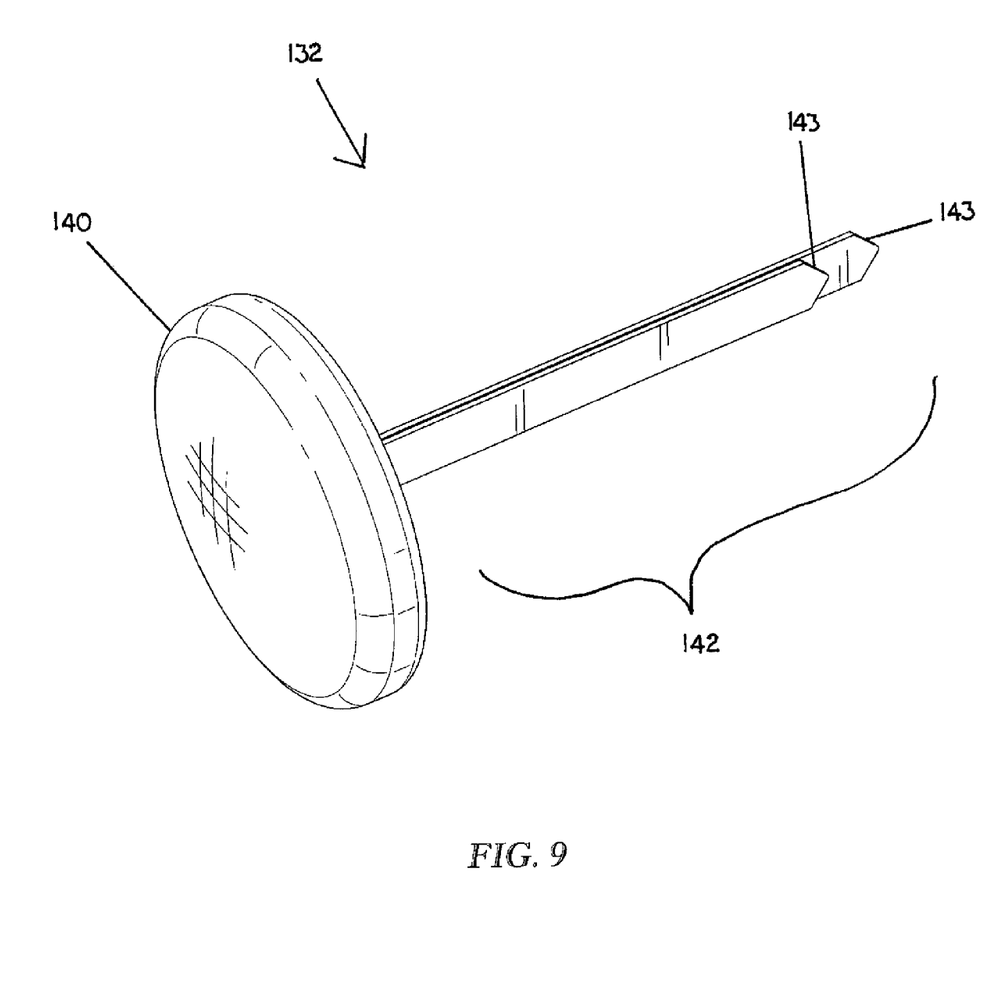
FIG. 9 is a side perspective view of a button element.

FIG. 9 shows a button element 132 adapted for placement in an attachment hole 134. In preferred embodiments, the button element 132 includes a head 140 and a shank 142, the head 140 being configured to match the aesthetics of the second furniture component 112. In this embodiment, the shank 142 comprises two elongated metal strips 143 biased to separate slightly; thereby increasing the friction fit in the attachment holes 134. In other embodiments, other shanks will be used, and in still other embodiments, other attachment dynamics will be used as will occur to those skilled in the art in view of the present disclosure.

Figure 10:
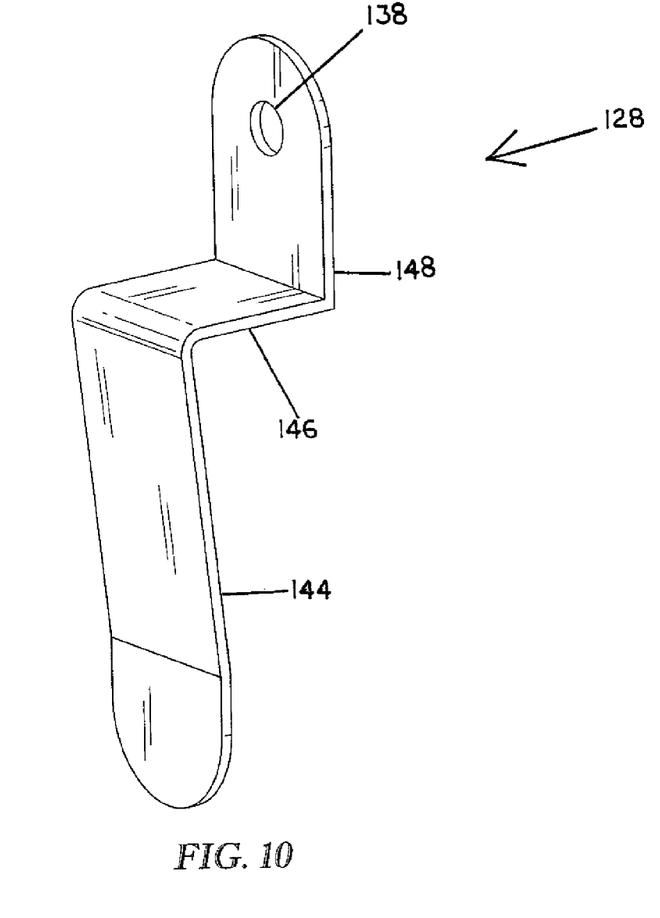
FIG. 10 is a side perspective view of a bracket.

FIG. 10 shows an embodiment of a bracket 128. In this embodiment, the bracket 128 serially includes a first, generally vertical, portion 144, a transverse portion 146, and a second vertical portion 148, the second vertical portion 148 including the opening 138. In some embodiments, the first vertical portion 144 is straight. In other embodiments, as shown in FIG. 10, the first vertical portion 144 may include a slight angle to bias the first vertical portion 144 against the first surface 116 when installed. In preferred embodiments, the first vertical portion 144 is sized to be accepted within the recessed portion 126 of the first surface 116. In some embodiments, the transverse portion 146 is sized to span the rim 127 of the first furniture component 114. In certain embodiments, the recessed portion 126 is configured to receive the first vertical portion 144 whereby the received portion of the bracket 128 is either flush or recessed to the first surface 116.

Figure 11:
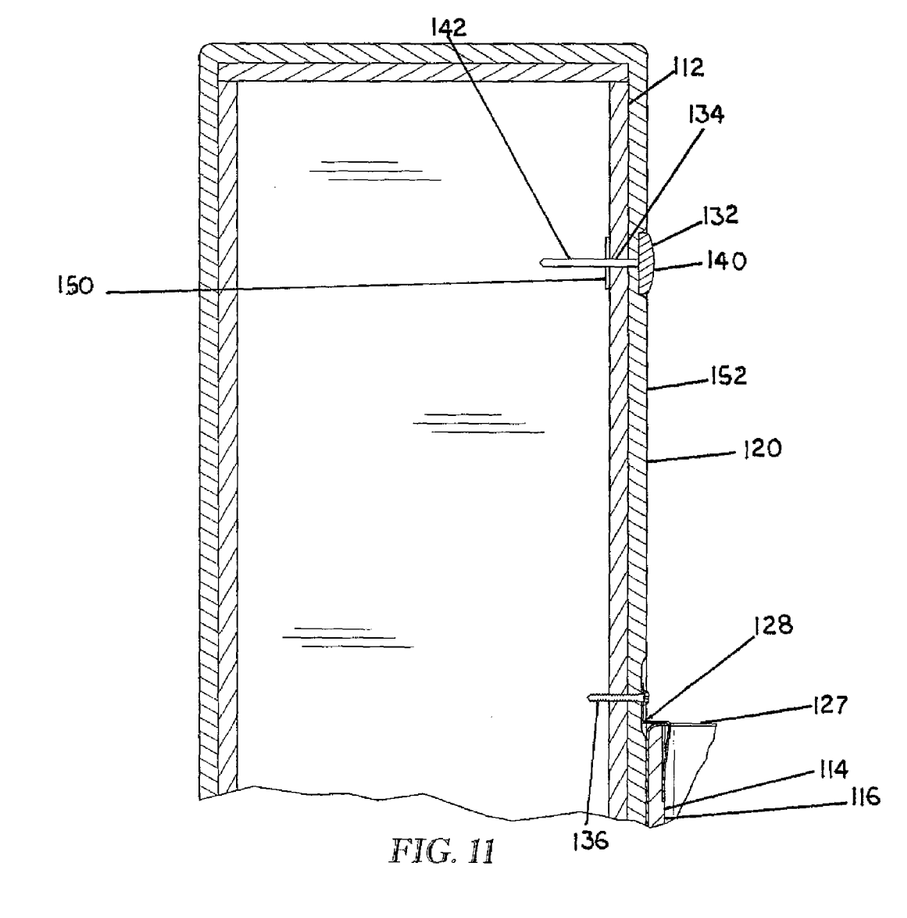
FIG. 11 is a cross-section view of the first and second furniture components taken along line 11-11 of FIG. 3.

FIG. 11 illustrates the second embodiment of the furniture connection system 110 using a cross-section view of FIG. 3. In some embodiments, the button element 132 is secured within the second furniture component 112 using a washer-type element 150. In use, the head 140 of the button element 132 is positioned on the outside of the second furniture component 112 with its shank 142 extending through the attachment hole 134. On the interior of the second furniture component 112, the shank 142 passes through the washer-type element 150, which fits snugly around it and improves the friction-fit resistance to the button element 132 working itself loose.

When installed, the bracket 128 contacts both the front surface 120 of the second furniture component 112 and the first surface 116 of the first furniture component 114. The bracket 128 is secured to the second furniture component 112 by a fastener 136 extending through the opening 138 and into the attachment hole 134. Due to the shape of the bracket 128, it mechanically secures the first furniture component 114 to the second furniture component 112. In some embodiments, the bracket 128 is pressed into the upholstery 152 of the second furniture component 112 such that the lid 124 may fit on the rim 127 flush against the front surface 120 and obscure the bracket 128 from view.

Figure 12:
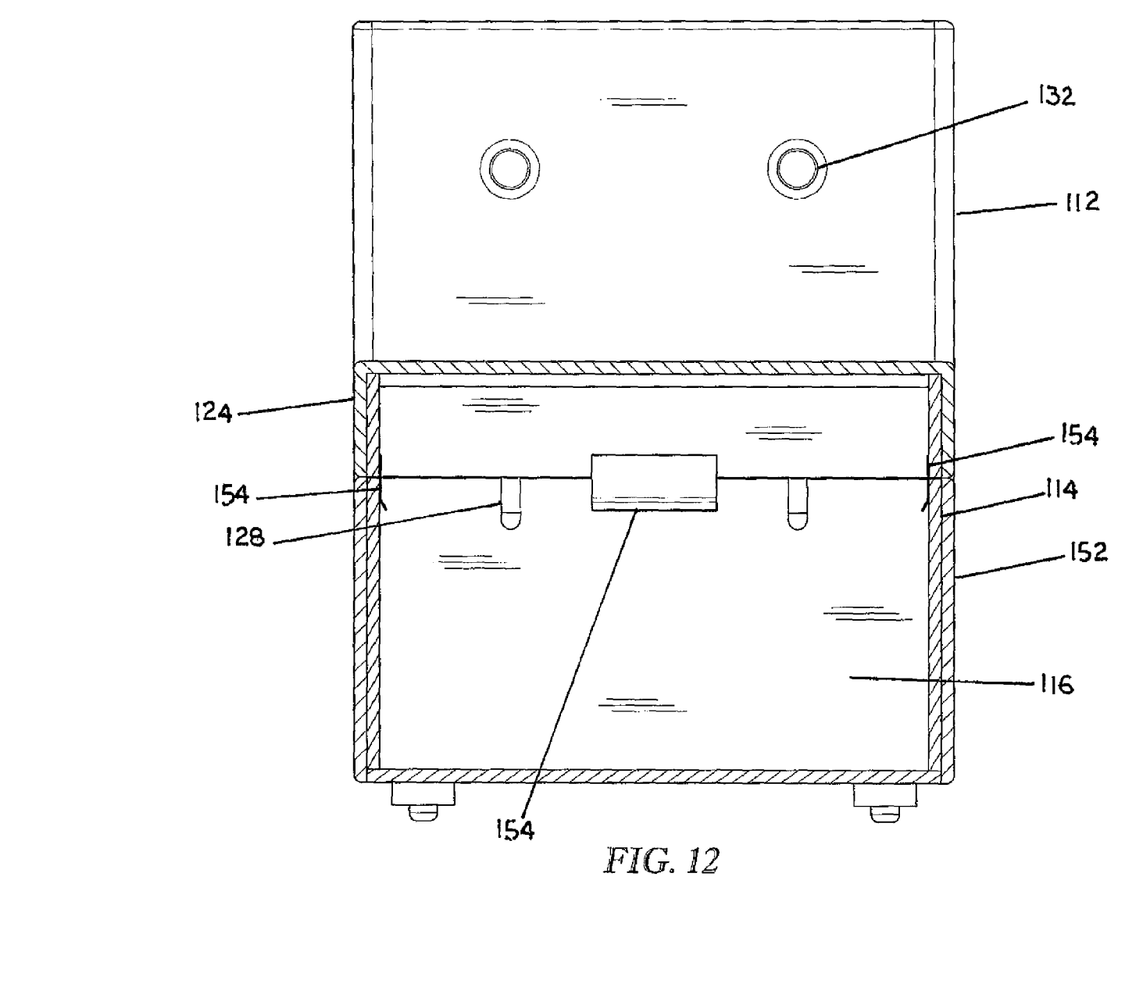
FIG. 12 is a cross-section view of the first and second furniture components taken along line 12-12 of FIG. 4

FIG. 12 illustrates the second embodiment of the furniture connection system 110 using a cross-section view of FIG. 4. In some embodiments, the removable lid 124 includes at least one tab 154 which extends downward from the lid 124. In some embodiments, each side of the lid 124 includes a downward extending tab 154. When placed on the seat box portion of the first furniture component 114, the tabs 154 extend into the cavity 122, contacting the sides of the rim 127 and preventing the lid 124 from sliding off the seat box portion. In some embodiments, as shown in FIG. 12, the tab 154 is sized to fit between recessed portions 126. In other embodiments, the tab 154 may extend over one or more recessed portions 126. As described, the first vertical portion 144 of the bracket 128 may fit flush or recessed to the first surface 116, such that the tab 154 may fit over the bracket 128.

In some embodiments, the first surface includes a plurality of recessed portions so that a user may select where to position the bracket so that the first and second furniture components can be shifted left or right in relation to each other and still have a recessed portion and attachment hole aligned for connection. For example, as shown in FIG. 1, the leftmost first furniture component fits flush with the second furniture component and the rightmost first furniture component extends past the right side of the second furniture component. A user could remove the brackets, shift both first furniture components to the left, and reattach the brackets, such that the rightmost first furniture component fits flush and the leftmost first furniture component extends past the side of the second furniture component. The terms left and right are used herein for ease of understanding and are not meant to be limiting.

In other embodiments, different types of furniture are configured with attachment holes and recessed positioning portions so that modular pieces can be combined and fixed together into a single "unit." While the figures depict a comparatively squat and generally rectangular first furniture component and a comparatively tall and generally rectangular second furniture component connected to for a seating space with a back, other furniture shapes are within the scope of the invention. For example, the front surface of a generally upright c-shaped second furniture component could be positioned adjacent to a generally cylindrical-shaped first furniture component and be connected thereto using the disclosed system.

While the figures depict either one or two first furniture components being connected to a single second furniture component, it should be understood that different combinations of first and second furniture components may be used. In some embodiments, a single first component may be connected to a single second component. In further embodiments, a single first component may be connected to two second components. In other embodiments, three first components may be connected to a single second component. In certain embodiments, three first components may be connected to two second components, where a left first component is connected to a left second component, a right first component is connected to a right second component, and a central first component is connected to both the left and right second components. In other embodiments, a second furniture component could include attachment holes and button elements on two different sides, effectively having two front surfaces using the nomenclature herein, and connect two first furniture components spaced apart from each other. Other combinations and arrangements will occur to those skilled in the art in view of the present disclosure.

All publications, prior applications, and other documents cited herein are hereby incorporated by reference in their entirety as if each had been individually incorporated by reference and fully set forth. While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A modular furniture system comprising:
   a first furniture component having an internal cavity defined by at least a first surface, and a rear surface opposite the first surface;
   a second furniture component having a front surface including at least one attachment hole;
   a bracket having opposing first and second ends; and
   a button element having a head and a shank adapted to be inserted into the at least one attachment hole;
   wherein, when the first furniture component is disconnected from the second furniture component, the shank of the button element is inserted into the at least one attachment hole; and
   wherein, when the first furniture component is connected to the second furniture component, the front surface of the second furniture component contacts the rear surface of the first furniture component, the second end of the bracket contacts the first surface, and the first end of the bracket is removably secured to the front surface of the second furniture component by a fastener engaging the first end of the bracket and positioned within the at least one attachment hole.

2. The modular furniture system of claim 1, wherein the bracket includes an opening, and wherein the fastener extends through the opening and into the at least one attachment hole.

3. The modular furniture system of claim 1, wherein the first surface includes at least one recessed portion configured to receive a portion of the bracket.

4. The modular furniture system of claim 1, including two first furniture components as described in claim 1 and including at least two brackets as described in claim 1, and wherein the second furniture component includes at least two attachment holes.

5. The modular furniture system of claim 4, wherein the two first furniture components are positioned adjacent to each other and adjacent to the second furniture component such that at least a portion of the rear surface of each first furniture component contacts the front surface of the second furniture component.

6. The modular furniture system of claim 5, further comprising a clip for connecting the two adjacent first furniture components.

7. The modular furniture system of claim 1, where the first furniture component is box shaped, with a rim surrounding the internal cavity, and a removable lid configured to fit atop the rim.

8. The modular furniture system of claim 7, wherein the lid includes at least one descending tab sized to fit within the internal cavity of the first furniture component.

9. The modular furniture system of claim 7, wherein the first surface is the surface of the internal cavity opposite the rear surface of the box.

10. The modular furniture system of claim 9, wherein the first surface includes at least one recessed portion configured to receive the second end of the bracket such that the second end of the bracket is either flush or recessed to the first surface.

11. The modular furniture system of claim 10, wherein the first furniture component further includes a plurality of recessed portions.

12. The modular furniture system of claim 7, wherein the bracket serially includes a first vertical portion, a transverse portion, and a second vertical portion, the second vertical portion including an opening, and the first vertical portion and second vertical portion extending in substantially opposite directions.

13. The modular furniture system of claim 12, wherein the first vertical portion extends into the internal cavity, the transverse portion extends across the rim, and the second vertical portion extends upwards along the front surface such that the opening is aligned with the attachment hole.

14. The modular furniture system of claim 7, wherein the lid, when positioned on the rim, conceals the bracket.

15. The modular furniture system of claim 1, wherein the head of the button element is larger than the at least one attachment hole.

16. The modular furniture system of claim 1, wherein the shank of the button element is configured such that a friction fit removably maintains the shank within the at least one attachment hole.

17. A method for removably connecting a first furniture component and a second furniture component, the method comprising:
- providing a first furniture component having an internal cavity defined by at least a first surface, and a rear surface opposite the first surface;
- providing a second furniture component having a front surface including at least one attachment hole;
- providing at least one button element having a head and a shank, the shank of the button element positioned within the at least one attachment hole;
- removing said at least one button element from the second furniture component;
- providing a bracket having opposing first and second ends;
- positioning the rear surface of the first furniture component adjacent to the front surface of the second furniture component;
- positioning the second end of the bracket against the first surface of the first furniture component; and
- connecting the first end of the bracket to the front surface of the second furniture component by a fastener engaging the first end of the bracket and positioned within the at least one attachment hole.

\* \* \* \* \*